(12) United States Patent
Nalawadi et al.

(10) Patent No.: US 7,017,035 B2
(45) Date of Patent: Mar. 21, 2006

(54) METHOD AND APPARATUS FOR USING AN ACPI NVS MEMORY REGION AS AN ALTERNATIVE CMOS INFORMATION AREA

(75) Inventors: Rajeev K. Nalawadi, Folsom, CA (US); Victor M. Munoz, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 10/263,396

(22) Filed: Oct. 2, 2002

(65) Prior Publication Data

US 2004/0068632 A1    Apr. 8, 2004

(51) Int. Cl.
G06F 9/24     (2006.01)
G06F 9/445    (2006.01)
G06F 9/00     (2006.01)

(52) U.S. Cl. .................. 713/1; 713/2; 713/100
(58) Field of Classification Search .......... 713/2, 713/1, 100
See application file for complete search history.

(56) References Cited

U.S. PATENT DOCUMENTS

| | | | | |
|---|---|---|---|---|
| 5,745,669 A | * | 4/1998 | Hugard et al. | 714/3 |
| 5,822,581 A | * | 10/1998 | Christeson | 713/1 |
| 6,282,640 B1 | * | 8/2001 | Klein | 713/1 |
| 6,438,687 B1 | * | 8/2002 | Klein | 713/1 |
| 6,622,243 B1 | * | 9/2003 | Christeson | 713/1 |

OTHER PUBLICATIONS

Compaq Computer Corp. et al., "Advanced Configuration and Power Interface Specification Rev. 2.0", Jul. 27, 2000, http://www.acpi.info, pp. 1-3, 235-238.*

* cited by examiner

Primary Examiner—Thomas Lee
Assistant Examiner—Ji H. Bae
(74) Attorney, Agent, or Firm—Sharon Wong

(57) ABSTRACT

Embodiments of the present invention provide for an ACPI Non-Volatile Sleeping (NVS) memory region that is allocated and defined so that a system BIOS can save CMOS based memory content at the ACPI NVS memory region during power on system test (POST). The ACPI NVS memory region and it's associated content, is accessible to both OS and non-OS software during runtime execution.

11 Claims, 5 Drawing Sheets

METHOD AND APPARATUS FOR USING AN ACPI NVS MEMORY REGION AS AN ALTERNATIVE CMOS INFORMATION AREA

BACKGROUND

1. Background Information

Computer systems typically include a processor, a random access memory device, and a read only memory device. Read only memory devices (ROM) provide a non-volatile form of memory that is not destroyed when power is removed from the computer system. Conventional computer systems are typically initialized (i.e. powered up) using the processing logic (i.e. firmware) stored within the ROM device internal to the computer system. Since the ROM device is non-volatile, the firmware within the ROM contains valid data or instructions. Conventional computer systems can, thus, be initialized using the firmware within the ROM.

Generally, the firmware stored in the ROM can be a basic input-output system (BIOS) software program. The execution of code that exists in the ROM is referred to as BIOS POST. The BIOS consists of code that provides the lowest level of interface to all the devices in the system and is responsible for early initialization and configuration of all the critical hardware resources of the computer system. With an open-system computer, such as a system which can have its configuration changed by adding or deleting either hardware or software components, the BIOS needs to have information about the current configuration of the system.

This information has generally been stored in complementary metal oxide semiconductor (CMOS) based memory. CMOS is non-volatile standalone coin-cell battery powered memory that is capable of retaining information, during periods of time when the computer system is not running. The CMOS RAM memory has typically been located in the same device that contains the Real Time Clock (RTC), a battery-backed clock that maintains the time and date independent of whether or not the computer system is powered on. The CMOS RAM contents hold critical pieces of data that are used by the system BIOS to decide on a particular policy of implementation for certain features.

Most modern operating systems (OSs), including Windows XP and later OSs, block CMOS content, such as system I/O port addresses, from non-OS software during the runtime environment functionality. The list of system I/O port addresses that are blocked includes the RTC along with other system input/output (I/O) addresses for the system timer, DMA and so forth. Since most of the modern OSs will block access to the CMOS RAM contents during runtime functionality, it is desirable that an alternative mechanism for accessing the CMOS RAM content be put in place.

DETAILED DESCRIPTION

In the following description, numerous specific details are set forth such as specific memory configurations, address ranges, protection schemes, etc., in order to provide a more thorough understanding of the present invention. It will be apparent, however, to one skilled in the art, that the present invention may be practiced without these specific details. In other instances, well known apparatus and steps have not been described in detail in order to avoid obscuring the invention.

Embodiments of the present invention provide for an ACPI Non-Volatile Sleeping (NVS) memory region that is allocated and defined so that a system BIOS can save CMOS based memory content at the ACPI NVS memory region during power on system test (BIOS POST). The ACPI NVS memory region and it's associated content, is accessible to both OS and non-OS software during runtime execution. Even though the ACPI NVS region resides in physical volatile memory it is referred to as Non-Volatile because the contents of memory region are intact during the system suspend states of S1, S3 and S4.

Figure 1:
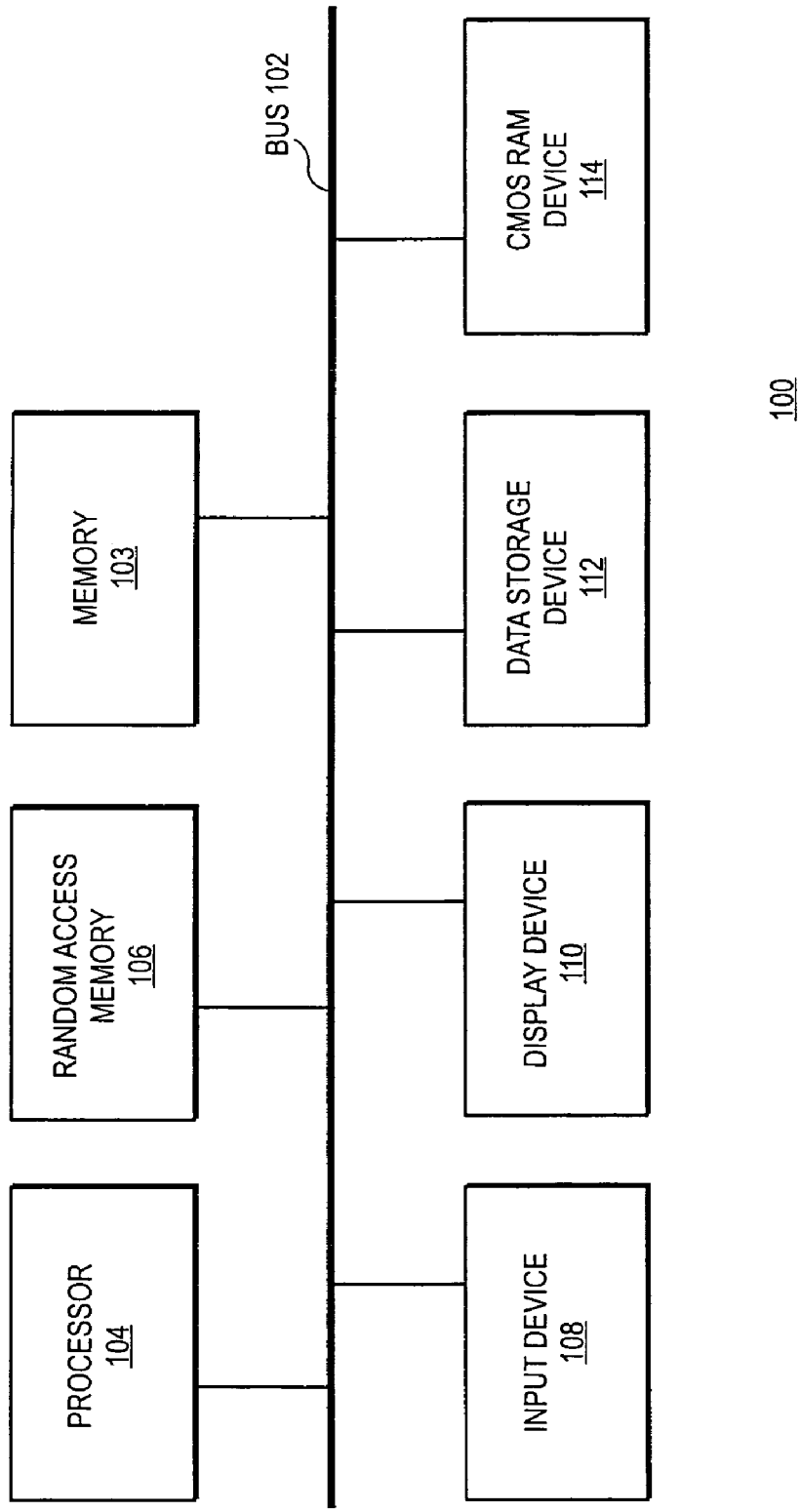
FIG. 1 illustrates a functional block diagram of an embodiment of an exemplary computer system embodying the present invention.

Referring to FIG. 1, a block diagram of an embodiment of a computer system 100 is illustrated. The preferred embodiment of the present invention is implemented using a microprocessor manufactured by Intel Corporation of Santa Clara, Calif. It will be apparent to those with ordinary skill in the art, however, that alternative processors and computer system architectures may be employed. In general, such computer systems 100 as illustrated in FIG. 1 include bus 102 for communicating information, processor 104, coupled with bus 102, for processing information, random access memory device 106, coupled with bus 102, for storing information and instructions for the processor 104, an input device 108 such as an alpha numeric input device or a cursor control device, coupled to bus 102, for communicating information and command selections to processor 104, display device 110, coupled to bus 102, for displaying information to a computer user, data storage device 112 such as a magnetic disk and disk drive coupled with bus 102 for storing information and instructions, and a CMOS RAM device 114 coupled with a bus 102 for storing system configuration information. The bus being defined here just implies that communication can occur between these interfaces but in real systems there may be multiple layers of processing involved in order for these different interfaces to communicate.

In addition, the computer system of the preferred embodiment includes system memory 116 coupled to the bus 102 for storing, in a non-volatile form, code and data. System memory 116 includes an ACPI NVS memory region that is allocated and defined so that the system BIOS can save CMOS based memory content at the ACPI NVS memory region during power on system test (POST). The ACPI NVS memory region and it's associated content, is accessible to both OS and non-OS software during runtime execution.

Figure 2:
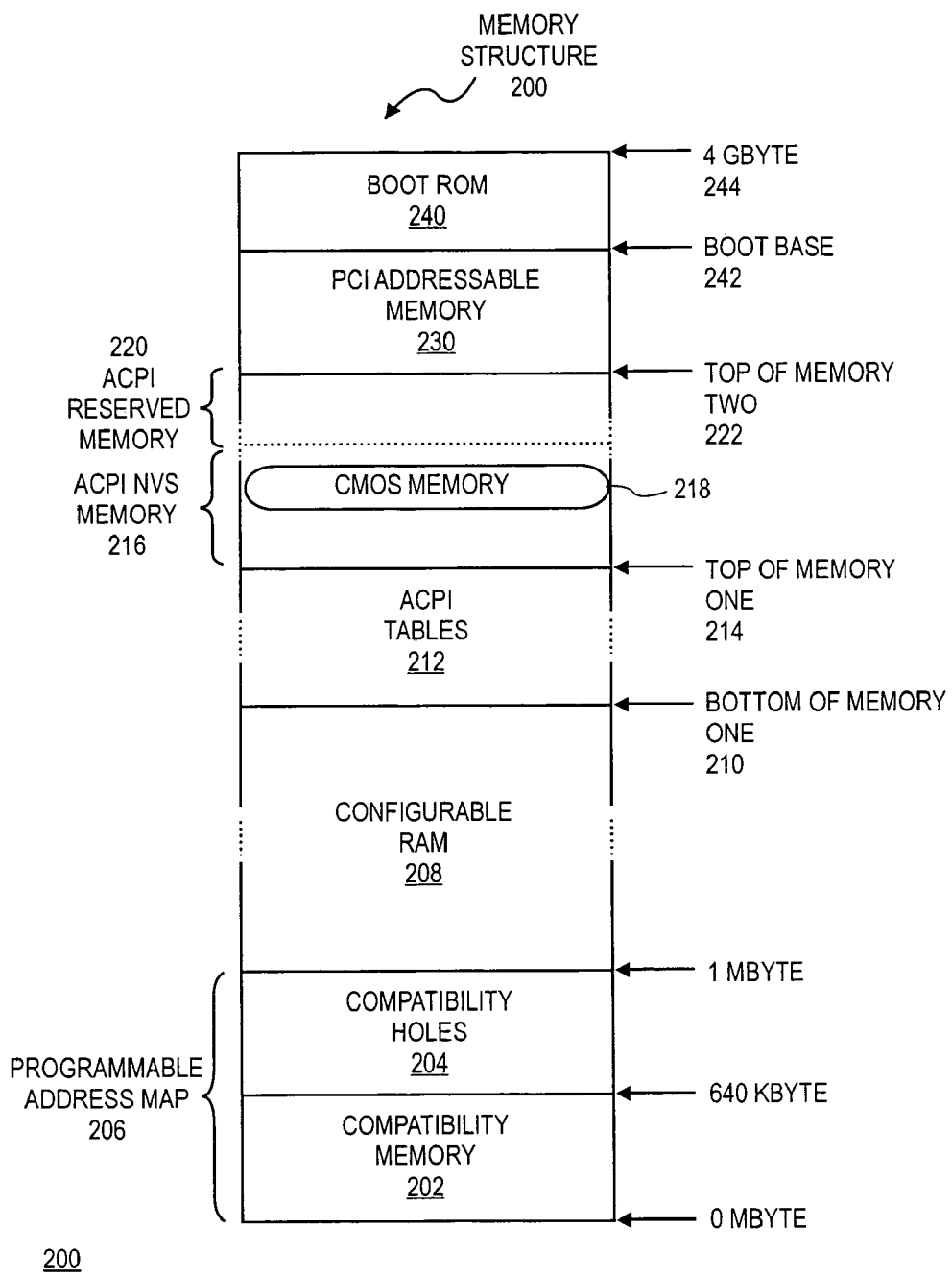
FIG. 2 illustrates a diagram of system memory showing the location of an embodiment of the invention.

FIG. 2 illustrates a diagram of an embodiment of a system memory showing the location of an embodiment of the invention. In one embodiment, the system memory is mapped according to memory structure 200, as defined in the ACPI specification. Compatibility memory 202 is located in the region of memory located at from 0 to 640 Kbytes. Compatibility holes 204 are located at from 640

Kbyte to 1 Mbyte. In traditional systems, the BIOS is limited to accessing compatibility memory 202 and compatibility holes 204. The compatibility memory 202 and compatibility holes 204 may be referred to as the programmable address map (PAM) region of memory 206.

The ACPI specification also defines operating system usable system memory as configurable RAM 208 which is located at from 1 Mbyte to the bottom of memory one 210. In one embodiment, bottom of memory one 210 may be 8 Mbytes.

ACPI tables 212 are located in the region from bottom of memory one 210 to an area referred to in the ACPI specification as the top of memory one, denoted 214 in FIG. 2.

The area of memory between the top of memory one and what the ACPI specification refers to as the top of memory two, denoted 222 in FIG. 2, is defined to include two regions of memory, ACPI NVS memory 216 and ACPI reserved memory 220. The ACPI NVS memory region typically holds data that is saved/restored during a resume from one of the ACPI power management suspend states. The ACPI NVS region also is used to hold data that is used to program various devices such as, for example, onboard chipsets, processor(s), PCI devices, AGP devices, Super I/O, etc. when resuming from a suspend state (for example: S3 Suspend to RAM state).

In accordance with one embodiment of the invention, the system BIOS obtains a portion of the NVS region of memory 216 and uses it to store CMOS RAM content at this location during POST that is later accessible to both OS and non-OS applications. In particular, one portion of memory is denoted ACPI NVS CMOS memory region 218 within or part of ACPI NVS memory 216. Referring to FIGS. 1 and 2, processor 102 pre-defines the range of addresses within the ACPI NVS memory region 216 that are used to store various CMOS content for SMM retrieval. An ACPI NVS parameter region 218 is defined and used to pass CMOS content. For example, the operation region offset, length and bit-length value(s) of the CMOS buffer are defined by the system BIOS during POST. The parameters can be defined as follows:

Operation Region (CMOS, System Memory, 0xFFFF0000, 0xFFFFC000)
Field (COS, AnyAcc, Lock, Preserve)
{CMOS_BUF, 256 //Define a 256 byte region}

The appropriate index of the ACPI ASL code operation region can be accessed by other parts of the ACPI code during runtime to retrieve the CMOS RAM contents without violating the restrictions that have been placed on other pieces of software by operating systems.

The ACPI specification also defines a "no memory region" referred to in one embodiment as Peripheral Component Interconnect (PCI) bus addressable memory 230 located between top of memory two and boot base 242. The memory area from boot base 242 to the top of memory 244, at, in one embodiment, 4 Gbytes, is virtually used for boot ROM 240.

Figure 3:
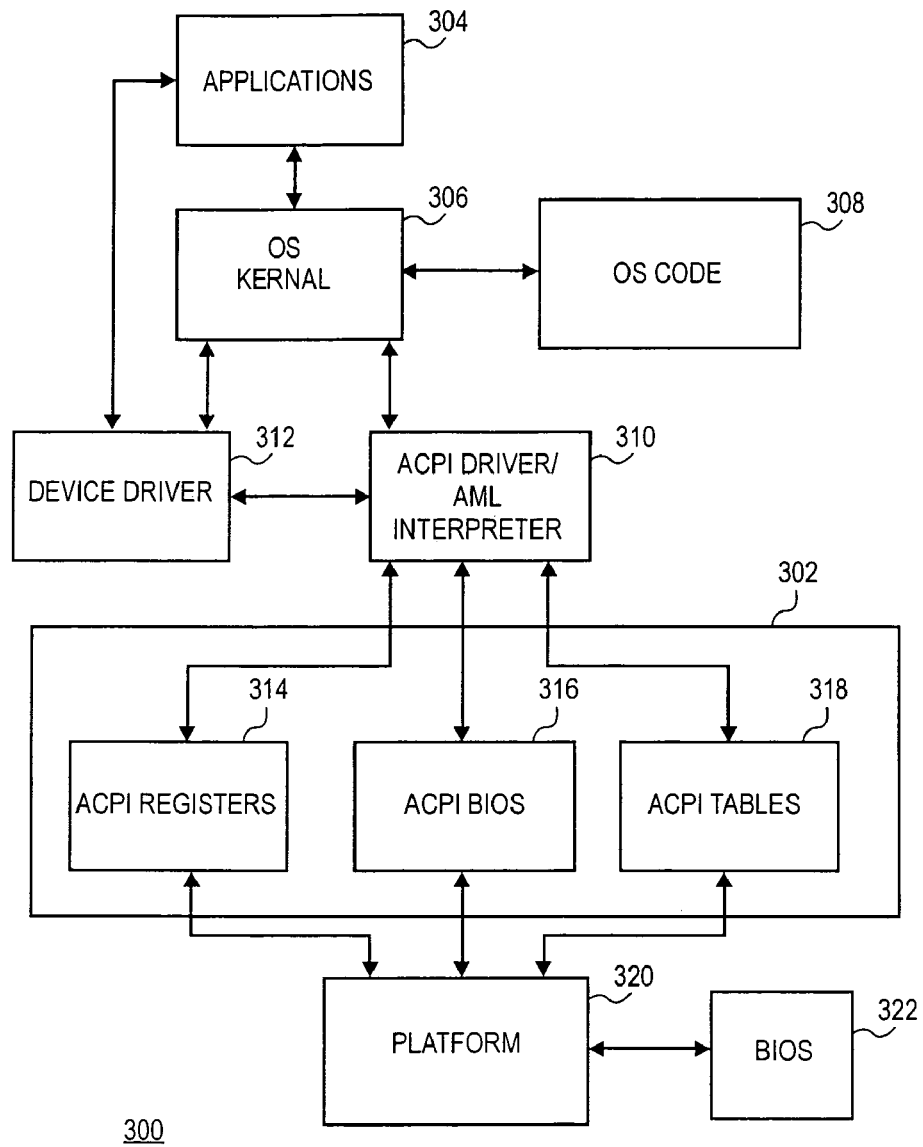
FIG. 3 illustrates a functional block diagram of an embodiment of an exemplary computer system implementing an ACPI system.

FIG. 3 illustrates a functional block diagram of an embodiment 300 of an exemplary computer system implementing an ACPI system 302. AML is a virtual machine language that is obtained after compiling the ASL code, in which ACPI control methods are written, and which is understandable to all ACPI-compatible operating systems. ACPI Device control methods are typically written by device manufacturers and provided to platform developers and manufacturers. Typically the ACPI tables, ACPI control methods are all present as part of the System BIOS ROM Image.

Operating system dependent software applications 304 run on a system interface, through kernel 306 with operating system control code 308 and ACPI driver/machine language interpreter 310. Operating system control code 308 and ACPI driver/machine language interpreter 310 operate in software within microprocessor (not shown), and are operating system specific. Kernel 306 also interfaces with device driver 312, also running in software on the microprocessor.

Through ACPI driver/machine language interpreter 310, software interfaces with ACPI registers 314, ACPI BIOS 316, and ACPI tables 318, to platform hardware 320 and, through platform hardware 320, to system BIOS 322. ACPI AML is a machine language capable of interfacing between any ACPI aware operating system and any system Basic Input Output System function. ACPI is intended to interface between hardware and software, though the requirements of the ACPI environment may be viewed in many respects as a hardware specification.

Device driver 312 allows interface with the platform hardware. ACPI tables 318 describe the interface to the hardware. Although some controls are embedded in fixed blocks of registers, ACPI tables 318 specify the addresses of the register blocks. When the operating system executes the ASL code, ACPI tables 316 can be accessed.

The ACPI specification, which is supported on current computing devices such as personal computers, provides a region in that can be used to store information. According to the system and method described herein, when system memory is mapped according to a specification such as the ACPI specification (rev. 2.0 dated Jul. 27, 2000; see also ACPI Component Architecture Programmer Reference, rev. 1.05 dated Feb. 27, 2001 available from Intel Corporation of Santa Clara, Calif.), a portion of a NVS region of memory may be used to store CMOS based memory content. The ACPI NVS memory region and it's associated content, is accessible to both OS and non-OS software during runtime execution.

In a typical implementation, when a system such as a computing device is powered on, the boot process begins. The Basic Input Output System (BIOS) code is transferred to and executes from the programmable address map (PAM) region of memory. The BIOS code determines the size of physical memory and builds a memory map based on system components. The BIOS code also copies software and/or other information obtained from various devices which may be part of the computing device or personal computer, such as, for example, the contents of modem option ROM, the contents of PGA video option ROM, local area network (LAN) card option ROM, small computer system interconnect (SCSI) option ROM, etc. The ROM and BIOS codes are typically stored in the PAM region of memory.

The BIOS code may also include Advanced Configuration and Power Interface (ACPI) software that implements the ACPI specification, including providing an interface by which the operating system may access ACPI tables. It is through this ACPI interface that information can be obtained to control the characteristics of motherboard devices and other devices coupled to the personal computing device.

CMOS content stored in the ACPI NVS memory region may be accessed by the OS and non-OS using ASL Control methods that access the Operation region(s) defined for ACPI NVS region. AML is the ACPI control method virtual machine language, a machine code for a virtual machine that is supported by an ACPI-compatible operating system. AML is a pseudo-assembly language that is interpreted by an operating system driver. AML is a language processed by an ACPI method interpreter and is primarily a declarative language in that AML provides a set of declarations that are compiled by the ACPI interpreter into the ACPI name space at definition block load time.

The AML resides in the ACPI tables and control methods within the system BIOS. A portion of the ACPI software in the BIOS known as ACPI control methods may be written in ACPI Source Language (ASL) as the source language. Original equipment manufacturers (OEMs) and BIOS developers may write control methods in ASL. The ASL code is then translated to AML. ASL and AML are different formats of the languages that are closely related. ASL is essentially what the software developer uses for his code development and AML is a machine language format that is produced by compiling the ASL code.

Figure 4:
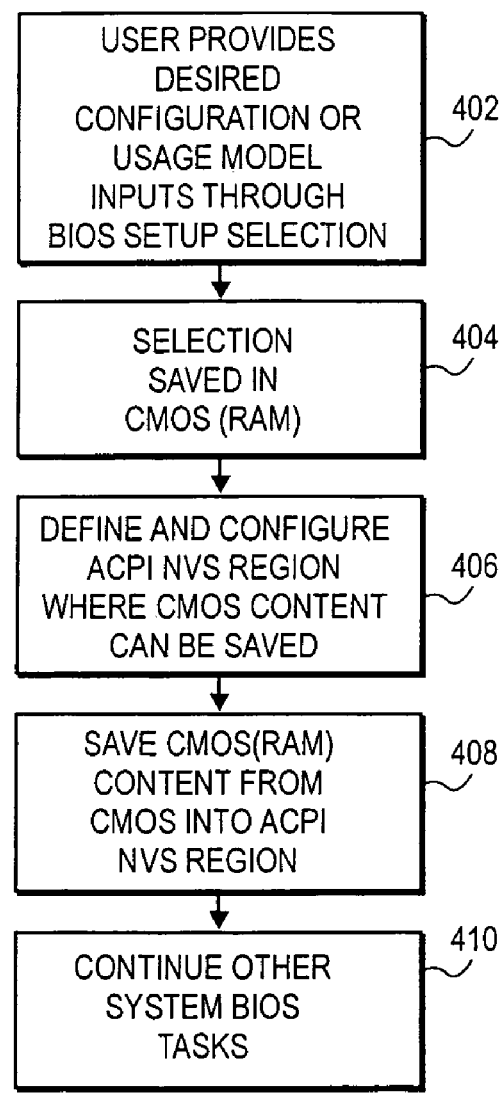
FIG. 4 illustrates a flow diagram of an embodiment of a routine for saving CMOS RAM contents into ACPI NVS memory region during system BIOS POST.

In accordance with one embodiment of the invention, the system BIOS obtains a portion of the NVS region of memory and uses it to store CMOS RAM contents at this location during POST that is later accessible by ACPI ASL. The ACPI code can be used to access the defined memory region during runtime to retrieve the CMOS RAM contents. Referring to FIG. 4, a flow diagram of an embodiment 400 of a routine for saving CMOS RAM content into ACPI NVS memory region during a system BIOS POST routine is illustrated.

In step 402, the user provides a desired configuration or usage model inputs through BIOS SETUP selection.

Initialization of the computer system is performed upon power-up of the computer system or hardware or software reset operations. In one boot scheme the processor is designed to read a pre-determined memory location when the processor is reset or powered up. The pre-determined memory location stores a pointer or an address that directs the processor to a memory address of the beginning of the bootstrap routines. The pointer or address is referred to as a boot vector.

The boot vector generally defaults to an address in read-only memory (ROM). The ROM stores the bootstrap loader and typically stores other initialization routines such as power on system test (BIOS POST). The device storing the bootstrap loader and other minimal initialization procedures is referred to as the boot device. Boot ROM 180 is the boot device in computer system 100.

The ROM may include routines for communicating with input/output devices in the computer system. In some computer systems these routines are collectively referred to as the Basic Input Output System (BIOS). The BIOS provides a common interface so that software executing on the processor can communicate with input/output devices such as the keyboard, mouse, nonvolatile mass memory storage device, and other peripheral devices.

In step 404, the selection is saved in CMOS based memory. Parameter information that identifies specific features of the input/output devices is stored in CMOS based memory. For example, parameter information might describe the number of disk drives, disk drive type, number of heads, tracks, amount of system RAM, user selection for some of operating conditions, parameters for configuring the system and so forth.

In step 406, the ACPI NVS memory region where CMOS RAM content to be saved is defined and configured. In step 408, the CMOS RAM content from various banks of CMOS is saved into the allocated ACPI NVS region. In a typical implementation, the first fourteen bytes of ACPI NVS memory region are defined and reserved for RTC time content. The content of the first CMOS RAM memory bank are saved to ACPI NVS memory region. The first CMOS RAM memory back is saved starting at offset address location 0Eh. If there are additional banks of CMOS RAM content to be saved, the content of the second CMOS memory is saved. Typically on most systems there is a Lower Bank of CMOS (128 bytes–14 bytes) and an Upper Bank of CMOS (128 bytes). The access to these two banks of CMOS is performed using a separate Index/Data pair of registers.

In step 410, after the CMOS RAM content is saved, the other system BIOS tasks are continued.

Figure 5:
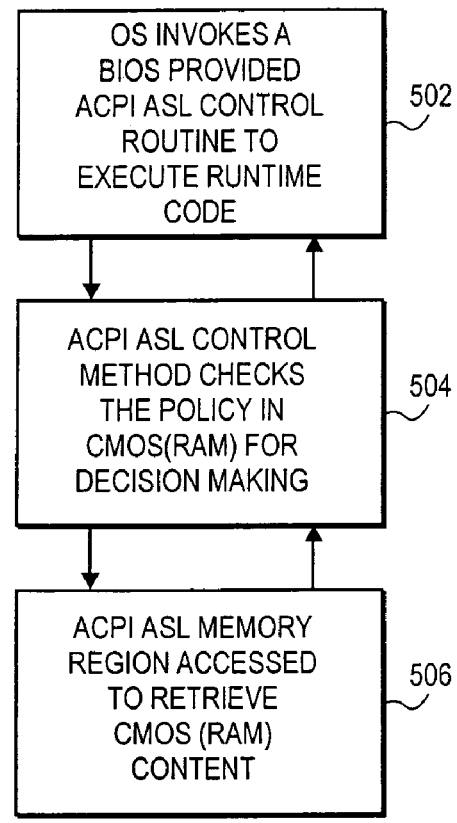
FIG. 5 illustrates a flow diagram of an embodiment of a routine for retrieving CMOS RAM contents from ACPI NVS memory region during runtime.

As described below, CMOS content is retrieved by runtime ACPI ASL code. Referring to FIG. 5, a flow diagram of an embodiment 500 of a routine for retrieving the CMOS RAM contents from ACPI NVS memory region during runtime is illustrated. The operating system initially invokes a BIOS provided ACPI ASL control method to execute the runtime code (step 502).

The ACPI ASL control method checks the policy available in CMOS RAM for decision-making (step 504). As noted above, a portion of ACPI NVS region is used to store CMOS RAM content.

The ACPI NVS memory region is accessed to retrieve the CMOS RAM contents (step 506). In a typical implementation, SMM handler is invoked by writing to the I/O trap address and invoking the SMM handler code and in turn the SMM handler code can generate a real mode interrupt signal to processor 102. SMM allows operating system and application software operation to be interrupted to perform certain functions. After performing the function(s), the operating system or application software operation is resumed from the point that it was interrupted. As noted above, the operation region offset, length and bit-length value(s) are defined by the system BIOS during POST. Specifically, a particular I/O address is used to define an ACPI operating region. Any write to this I/O range address generates an I/O trap SMI.

The invocation of the ACPI ASL control method during runtime execution causes the invocation of SMM handler after the CMOS RAM contents have been placed in the ACPI NVS memory region.

Some typical scenarios that benefit or require the CMOS RAM contents to be accessed by the ACPI ASL control code and hence use of embodiments of the present invention during runtime include, but are not limited to:

checking whether IOAPIC functionality is enabled;
    checking whether to allow wakeup from certain devices;
    checking on some display panel settings for video BIOS;
    checking on display output selections priority (for example, CRT, LVDS, TV);
    restoring video contents; and
    saving other critical platform configurations.

Referring to FIGS. 1 and 5, when a real-mode interrupt is received, processor 102 waits for all pending writes to complete. Processor 102 also waits for writes pending on external devices, such as external caches. Once all pending writes are completed, the processor then saves some of its current execution state to memory and begins execution of the SMM handler, a software routine that performs predefined functions. Processor 102, in response, asserts the real mode interrupt control signal that accesses SMRAM 110. The necessary CMOS RAM content are accessed from the ACPI NVS parameter memory region (FIG. 2, 218) and processor 102 jumps to a location in memory to execute the SMM handler code for performing real mode interrupt invocations to retrieve CMOS RAM content. Upon completion of the content, the SMM handler executes a resume (RSM) instruction that restores processor's 102 context from SMRAM, de-asserts the real mode interrupt signal, and then returns control to the ACPI ASL control method or previously interrupted operating system or application program execution.

After the CMOS RAM content is retrieved, control is transferred back to the ACPI ASL (steps 504–502).

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A computer system, comprising:
   a processor;
   CMOS RAM device coupled to the processor, the CMOS RAM device having information programmed therein;
   an ACPI NVS memory region coupled to the processor to receive selected information from CMOS RAM information; and
   a controller to facilitate saving information from CMOS RAM device into the ACPI NVS memory region, wherein the controller facilitates saving information from selected banks of the CMOS RAM device into the ACPI NVS memory region during system BIOS POST.

2. The computer system of claim 1, wherein the controller determines a policy available in the CMOS RAM device for decision making prior to accessing the ACPI NVS memory region to access CMOS RAM information.

3. In a computer system having a processor, a computer readable CMOS RAM device coupled to the processor, the CMOS RAM device having system configuration information programmed therein, the ACPI NVS memory region having a first block of memory including CMOS RAM configuration information therein, a computer-implemented process for storage and retrieval of CMOS configuration information comprising:
   copying information from the CMOS RAM device to the first block of memory of the ACPI NVS memory region; and
   accessing information from the ACPI NVS memory region if the information cannot be accessed from the CMOS RAM device; and
   saving information from selected banks of CMOS RAM device into the ACPI NVS memory region during system BIOS POST.

4. The computer system claimed in claim 3, further comprising:
   determining CMOS RAM device decision making policy prior to accessing the ACPI NVS memory region to access CMOS RAM information.

5. The computer system claimed in claim 3, wherein accessing information from the ACPI NVS memory region if the information cannot be accessed from the CMOS RAM device further comprises:
   initiating a transfer of configuration information from the CMOS RAM device to the ACPI NVS memory region during system BIOS POST.

6. An apparatus for maintaining a backup copy of information, comprising:
   a CMOS RAM device capable of storing the information;
   a NVS memory region adapted to receive information from the CMOS RAM device, the CMOS RAM device capable of transmitting configuration information to the NVS memory region; and
   a controller adapted to control transfer of configuration information between the CMOS RAM device and ACPI NVS memory region during system BIOS POST.

7. The apparatus of claim 6, wherein the controller automatically accesses information from the ACPI NVS memory region when the information from the CMOS RAM device is inaccessible.

8. A method for selecting information from either a CMOS RAM device or a ACPI NVS, comprising:
   determining whether information stored in the CMOS RAM device is accessible;
   selecting information from the CMOS RAM device if the information is accessible; and
   selecting information from the ACPI NVS if the information in the CMOS RAM device is inaccessible and the ACPI NVS contains a copy of the information; and
   saving information from selected banks of the CMOS RAM device into the ACPI NVS memory region during system BIOS POST.

9. The method of claim 8, further comprising:
   automatically accessing the ACPI NVS memory region when the CMOS RAM device is rendered inaccessible.

10. A machine readable medium having stored therein a plurality of machine readable instructions executable by a processor to select information from either a CMOS RAM device or a ACPI NVS memory region, comprising:
    instructions to determine whether information stored in the CMOS RAM device is accessible;
    instructions to select information from the CMOS RAM device the information is accessible; and
    instructions to select information from the ACPI NVS memory region if the information in the CMOS RAM device is inaccessible and the ACPI NVS memory region contains a copy of the information; and
    instructions to save information from selected banks of the CMOS RAM device into the ACPI NVS memory region during system BIOS POST.

11. The machine readable medium of claim 10, further comprising:
    instructions to automatically access the ACPI NVS memory region when the CMOS RAM device is rendered inaccessible.

* * * * *

UNITED STATES PATENT AND TRADEMARK OFFICE
CERTIFICATE OF CORRECTION

PATENT NO. : 7,017,035 B2 Page 1 of 1
APPLICATION NO. : 10/263396
DATED : March 21, 2006
INVENTOR(S) : Nalawadi et al.

It is certified that error appears in the above-identified patent and that said Letters Patent is hereby corrected as shown below:

Column 8, at line 7, before "NVS" insert --ACPI--.

Column 8, at line 10, before "NVS" insert --ACPI--.

Column 8, at line 19, after "NVS" insert --memory region,--.

Column 8, at line 24, after "NVS" insert --memory region--.

Column 8, at line 26, after "NVS" insert --memory region--.

Signed and Sealed this

Fourth Day of December, 2007

JON W. DUDAS
*Director of the United States Patent and Trademark Office*